United States Patent
Mir et al.

(10) Patent No.: US 10,845,230 B2
(45) Date of Patent: Nov. 24, 2020

(54) TWO-WIRE CIRCUIT FUNCTION BY SUPPLY MODULATION

(71) Applicant: Methode Electronics, Inc., Chicago, IL (US)

(72) Inventors: Assed Mir, Halifax (GB); Antony Brough, Clitheroe (GB)

(73) Assignee: Methode Electronics, Inc., Chicago, IL (US)

( * ) Notice: Subject to any disclaimer, the term of this patent is extended or adjusted under 35 U.S.C. 154(b) by 37 days.

(21) Appl. No.: 16/386,617

(22) Filed: Apr. 17, 2019

(65) Prior Publication Data

US 2019/0323876 A1    Oct. 24, 2019

Related U.S. Application Data

(60) Provisional application No. 62/659,385, filed on Apr. 18, 2018.

(51) Int. Cl.
*G01F 23/24* (2006.01)
*H01H 35/18* (2006.01)

(52) U.S. Cl.
CPC .............. *G01F 23/24* (2013.01); *H01H 35/18* (2013.01)

(58) Field of Classification Search
CPC ................................ G01F 23/24; H01H 35/18
See application file for complete search history.

(56) References Cited

U.S. PATENT DOCUMENTS

| | | |
|---|---|---|
| 6,734,793 B1 | 5/2004 | Dreyer et al. |
| 7,373,817 B2 | 5/2008 | Burdi et al. |
| 8,024,967 B2 | 9/2011 | Burdi et al. |
| 8,291,761 B2 | 10/2012 | Burdi et al. |
| 8,844,351 B2 | 9/2014 | Burdi et al. |
| 9,441,624 B2 | 9/2016 | Burdi et al. |
| 10,067,081 B2 | 9/2018 | Schleith et al. |
| 2002/0075162 A1 | 6/2002 | Wagner et al. |

FOREIGN PATENT DOCUMENTS

WO    2004095388 A2    11/2004

OTHER PUBLICATIONS

International Search Report dated Aug. 7, 2019; International Application No. PCT/US2019/027831; International Filing Date: Apr. 17, 2019; 4 pages.
Written Opinion dated Aug. 7, 2019; International Application No. PCT/US2019/027831; International Filing Date: Apr. 17, 2019; 3 pages.

*Primary Examiner* — Robert L Deberadinis
(74) *Attorney, Agent, or Firm* — Blank Rome LLP

(57) ABSTRACT

An active three-wire fluid level sensor employed in an application designed for a two-wire switch is disclosed. A fluid level sensor assembly includes a fluid level sensor including first, second, and third wires. The third wire carries an output signal configured to fluctuate between a low output signal level and a high output signal level. The fluid level sensor assembly also includes a supply modulation driver electrically connected to the third wire. The fluid level sensor, via the first, second, and third wires, is configured to serve as an input to a two-wire input electronic control unit (ECU). A method of operating a two-wire circuit function by supply modulation is also disclosed.

20 Claims, 1 Drawing Sheet

TWO-WIRE CIRCUIT FUNCTION BY SUPPLY MODULATION

RELATED APPLICATIONS

Figure 1:
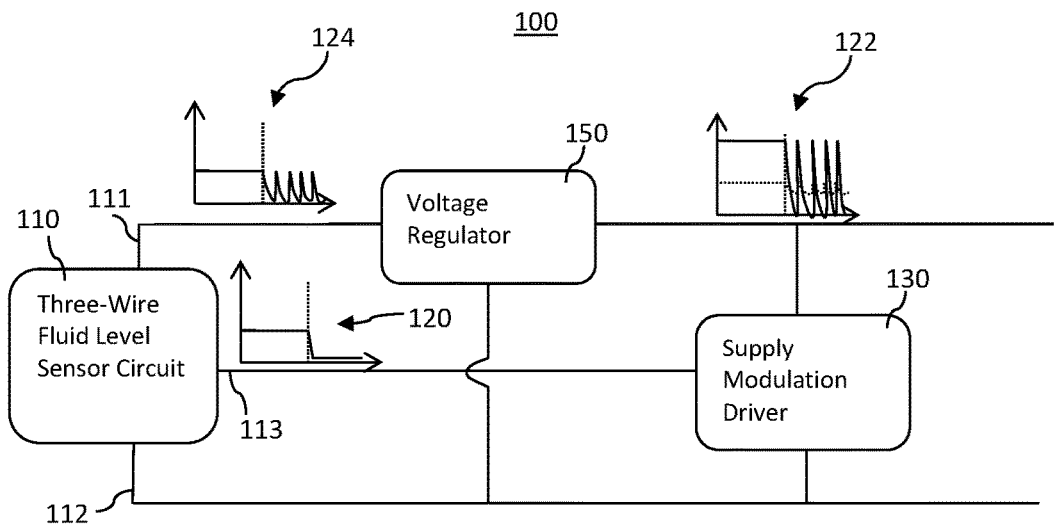

This application claims benefit of priority of U.S. Provisional Application No. 62/659,385, filed Apr. 18, 2018, which is incorporated herein by reference.

FIELD OF THE INVENTION

The present invention relates generally to fluid level sensing products; and more particularly to a capability of applying active fluid level sensors to a design having a two-wire float switch.

BACKGROUND OF THE INVENTION

Existing fluid level sensor products often include electronically active integrated circuits requiring a three-wire connection. Supply voltage is typically 5V; ground voltage is typically 0V; and a signal line is active high or low, and may require pull up to ensure steady state. Such a three-wire system prevents use of a three-wire sensor product in a simple two-wire float switch (such as a reed switch or a two-wire Hall sensor) application often found in automotive washer fluid bottles/containers. However, these two-wire float switches are of mechanical type and potentially have reliability issues. For example, these sensors employ magnets whose magnetic force is extremely proportional to temperature. Thus, the magnets operate very differently at high temperatures versus at low temperatures. Another drawback lies in the fact that two-wire switches are typically inserted through the side wall of the vessel. The present invention makes it possible to apply active three-wire fluid level sensors to an application designed for a two-wire float switch.

SUMMARY OF THE INVENTION

An active three-wire fluid level sensor is employed in an application designed for a two-wire switch. Embodiments are directed to a fluid level sensor assembly which includes a fluid level sensor including first, second, and third wires. The third wire carries an output signal configured to fluctuate between a low output signal level and a high output signal level. The fluid level sensor assembly also includes a supply modulation driver electrically connected to the third wire. The fluid level sensor, via the first, second, and third wires, is configured to serve as an input to a two-wire input ECU.

Embodiments are also directed to a method of operating a two-wire circuit function by supply modulation. The method includes triggering a fluid level sensor including first, second, and third wires. The third wire carries an output signal configured to fluctuate between a low output signal level and a high output signal level. A fluctuation from the low to the high output signal level, or from the high to the low output signal level, is an output signal change of state. The method also includes activating a supply modulation driver upon receipt of the output signal change of state from the third wire. The method further includes creating a voltage oscillation, by the activated supply modulation driver, configured to serve as an input to a two-wire input ECU.

Additional embodiments and additional features of embodiments for the fluid level sensor assembly and method of operating a two-wire circuit function by supply modulation are described below and are hereby incorporated into this section.

BRIEF DESCRIPTION OF THE ILLUSTRATED EMBODIMENTS

Figure 2:
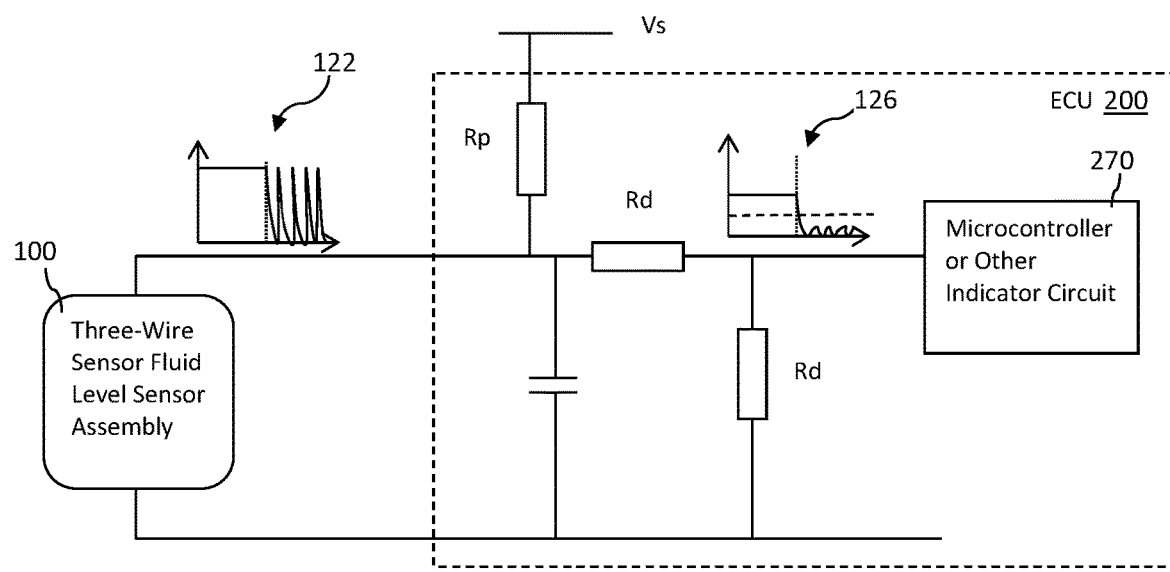

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown:

FIG. 1 is a diagram illustrating a circuit of a fluid level sensor assembly including a three-wire fluid level sensor, a supply modulation driver, and a voltage regulator, in accordance with an embodiment of this disclosure; and FIG. 2 is a diagram illustrating a circuit of the fluid level sensor assembly shown in FIG. 1 interfaced to an ECU.

DETAILED DESCRIPTION OF THE ILLUSTRATED EMBODIMENTS

It is to be understood that the figures and descriptions of the present invention may have been simplified to illustrate elements that are relevant for a clear understanding of the present invention, while eliminating, for purposes of clarity, other elements found in a typical fluid level sensor assembly, typical method for operating a fluid level sensor assembly, typical ECU, or typical method for operating an ECU. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will be made to the drawings wherein like structures are provided with like reference designations.

Before explaining at least one embodiment in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, systems, methods, features, and advantages will be or become apparent to one with skill in the art upon examining the drawings and the detailed description herein. It is intended that all such additional devices, systems, methods, features, and advantages be protected by the accompanying claims.

For purposes of this disclosure, the phrases "supply modulation driver", "supply modulation circuit", "supply modulation driver circuit" and "modulation circuit driver", and term "modulator" may all be used interchangeably.

For purposes of this disclosure, the phrase "indicator circuit" and terms "microcontroller" and "controller" may all be used interchangeably.

For purposes of this disclosure, the phrase/acronym "ECU" may refer to a conventional ECU or other ECU. Further, "ECU" is not to be limited to vehicles.

A goal of this disclosure is to interface a three-wire fluid level sensor to a two-wire input ECU circuit, and thus effectively place the three-wire fluid level sensor where a two-wire float switch is typically positioned.

The present disclosure provides a modulation circuit together with a three-wire fluid level sensor circuit. When a pre-determined fluid level is detected, a change of state of an output signal of the fluid level sensor occurs, causing modulation of a supply voltage of the ECU such that the supply voltage fluctuates, thereby becoming periodic. After filtering within the ECU, the fluctuating supply voltage is seen as low by the indicator circuit of the ECU, thus providing indication of the fluid level.

FIG. 1 illustrates an embodiment of a fluid level sensor assembly 100 including a fluid level sensor 110, a supply modulation driver or circuit 130, and a supply voltage regulator 150. When the fluid level sensor 110 is not triggered, the output signal at wire 113 is held high and the supply modulation function of the assembly is inactive. The voltage supply to the three-wire fluid level sensor 110 circuit is stable and high. When the fluid level sensor 110 is triggered, the supply modulation driver 130 is enabled. The supply modulation driver 130 will pull the voltage supply line to ground (see plot 122 in FIG. 1). This drop in the voltage supply deactivates the fluid level sensor 110 circuit, which de-activates the supply modulation driver 130. Power is then restored to the fluid level sensor 110 circuit, which once again measures a target (here, a fluid level). Once triggered, this process is repeated, resulting in a fluctuating voltage supply line.

FIG. 2 illustrates an embodiment of the fluid level sensor assembly 100 shown in FIG. 1 interfaced to an ECU 200. The ECU 200 can have a low impedance pull-up resistor $R_p$ and a voltage divider (including two resistors $R_d$, $R_d$) before an indicator circuit/driver or controller input 270. When the three-wire fluid level sensor 110 and supply modulation driver 130 (i.e., in combination, the fluid level sensor assembly 100) is inactive, the voltage input to the ECU is divided via the voltage divider and is steady at some voltage (e.g., 5V) acceptable to the indicator circuit 270. When the three-wire fluid level sensor assembly 100 is triggered, the supply voltage fluctuates, and the voltage at the controller is filtered and seen as low or below a triggering threshold of the indicator circuit 270 (e.g., 1.25 V, see plot 126 in FIG. 2).

With reference to FIGS. 1 and 2, embodiments are directed to a fluid level sensor assembly 100 which includes a fluid level sensor 110 including first, second, and third wires (111, 112, 113, respectively). The third wire 113 carries an output signal configured to fluctuate between a low output signal level and a high output signal level. The fluid level sensor assembly 100 also includes a supply modulation driver 130 electrically connected to the third wire 113. The fluid level sensor 110, via the first, second, and third wires (111, 112, 113), is configured to serve as an input to a two-wire input ECU 200.

In an embodiment, the first wire 111 provides a supply voltage (e.g., 5 V) to the fluid level sensor 110. The first wire 111 may be configured to be electrically connected to a source voltage $V_s$ (e.g., 12 V) via a voltage regulator 150 and a pull up resistor $R_p$ within the ECU 200.

In an embodiment, the supply modulation driver 130 is configured to modulate the supply voltage when the supply modulation driver 130 is active (see plot 122 in FIGS. 1 and 2). The supply modulation driver 130 is active when the supply modulation driver 130 receives and is triggered by the output signal (i.e., change of state of the output signal) of the fluid level sensor 110, via the third wire 113.

In an embodiment, the supply modulation driver 130 is active when the supply modulation driver 130 receives and is triggered by a low output signal level of the output signal, via the third wire 113. The modulated supply voltage (plot 122 in FIGS. 1 and 2) results in a drop in the supply voltage at the first wire 111, triggering a disruption of power to the fluid level sensor 110. The disruption of power deactivates the fluid level sensor 110, which releases (deactivates) the supply modulation driver 130, resulting in a re-application of power to the fluid level sensor 110 via a rise in the supply voltage (e.g., 5 V) at the first wire 111. The disruption and re-application of power to the fluid level sensor 110, via the respective drop and rise in the supply voltage (e.g. 0 V to 12 V), is repeated, to create voltage oscillation configured to activate an indicator circuit 270 of the ECU 200. In a particular embodiment, the low output signal level and the high output signal level correspond, respectively, to active and inactive states of the fluid level sensor 110, and after filtering, in the active state, result in a low signal at the input of the indicator circuit 270 (see plot 126 in FIG. 2).

In an embodiment, the fluid level sensor assembly 100 further includes a voltage regulator 150 electrically connected to the first wire 111, such that the supply voltage to the fluid level sensor 110 is regulated (e.g., 5 V). The voltage regulator 150 also regulates the modulated supply voltage, thereby effecting the fluid level sensor 110 via the first wire 111.

In an embodiment, the supply modulation driver 130 is inactive when the output signal is at the high output signal level.

In an embodiment, the second wire 112 is configured to be electrically connected to ground, and the supply modulation driver 130 is further electrically connected to ground.

In an embodiment, a fluctuation from the low to the high output signal level, or from the high to the low output signal level, is an output signal change of state, and wherein the supply modulation driver 130 is activated, from a de-activated condition, upon receipt of the output signal change of state from the third wire 113. Activation of the supply modulation driver 130 creates a voltage oscillation (e.g. 0 V to 12 V) at the input of the ECU 200, where, after filtering, averages out as a low signal to activate an indicator circuit 270 of the ECU 200 (see plot 126 in FIG. 2).

With further reference to FIGS. 1 and 2, embodiments are also directed to a method of operating a two-wire circuit function by supply modulation. The method includes triggering a fluid level sensor 110 including first, second, and third wires (111, 112, 113, respectively). The third wire 113 carries an output signal configured to fluctuate between a low output signal level and a high output signal level. A fluctuation from the low to the high output signal level, or from the high to the low output signal level, is an output signal change of state. The method also includes activating a supply modulation driver 130 upon receipt of the output signal change of state from the third wire 113. The method further includes creating a voltage oscillation (e.g., 0 V to 12 V), by the activated supply modulation driver 130, configured to serve as an input to a two-wire input ECU 200.

In an embodiment, the voltage oscillation of the activated supply modulation driver 130, after filtering, creates a low signal configured to activate an indicator circuit 270 of the ECU 200.

In an embodiment, the first wire 111 and the second wire 112 of the fluid level sensor 110 are configured to connect to the input of the two-wire input ECU 200.

In an embodiment, the method further includes regulating a supply voltage to the fluid level sensor 110 (e.g., 5 V) by a voltage regulator 150 electrically connected to a first wire 111 of the fluid level sensor 110 and configured for electrical connection with an input of the two-wire input ECU 200.

The three-wire fluid level sensor may be of the type employed in U.S. Pat. No. 9,441,624, issued to Burdi et al., and is effectively a field effect transistor (FET) performing field effect sensing by employing field effect sensors, in a manner similar to capacitive sensing (e.g., the three-wire fluid level sensor induces capacitive interaction via a FET). By utilizing a three-wire fluid level sensor of this type, a float and microswitch typically employed in two-wire float switches can be advantageously eliminated.

The three-wire fluid level sensor assembly of this disclosure may employ a printed circuit board (PCB) with a single electrode/switching/sensing point (for an individual or single fluid level sensing point), or may be a series of electrodes/switching/sensing points (e.g., two or more, for multiple fluid level sensing points, thereby resulting in continuous fluid level sensing). In the multiple-electrode scenario, the electrodes would all be driven by a single circuit or, alternatively, a separate circuit may drive each electrode. Thus, circuit(s) may be designed around a single switching point, or multiple switching points, driven by a controller or a circuit. The multiple-electrode sensor may be used for continuous/multiple zone sensing, whereas the single-electrode sensor may be used for single zone sensing.

In either scenario, as each electrode is covered by a fluid or has fluid covering a portion of a printed circuit board (PCB) corresponding or associated with the covered electrode, this electrode is triggered. Each electrode may be driven by controller (e.g., micro) or a sensor circuit (e.g., an integrated circuit) on a rear of the PCB. Current required to drive the three-wire fluid level sensor assembly circuit can be very low (e.g., in a range of 180 µA to 220 µA). Because the current required to drive the circuit is very low, the output signal is not sufficiently loaded to pull the signal down. This, therefore, beneficially provides circuit operation without loading the signal, and the circuit may draw more current, when desired, to indicate that the fluid level sensor is triggered.

As noted, the two input terminals of an ECU are typically connected to a standard float switch. One input terminal of the ECU is connected to ground and the other terminal is connected to a circuit inside a instrumentation cluster, usually in a vehicle, which connects to a pull up resistor and to a supply voltage (e.g., 12 V). In an embodiment of the disclosure, however, a three-wire fluid level sensor assembly circuit operates at approximately 5V. The three-wire fluid level sensor has an output signal (at a third wire) which transitions from high to low output level when fluid is present, or when a pre-determined fluid level occurs. Alternatively, a transition from low to high output level (thus, the particular change in state of the output level), when the pre-determined fluid level occurs can be dependent on design.

With a 12 V supply voltage, an embodiment includes a voltage-regulated circuit losing 7 V, resulting in the three-wire fluid level sensor functioning at 5 V. In an embodiment detecting low-fluid level, assuming fluid level is sufficiently high, nothing happens (i.e., the output signal from the fluid level sensor will remain high) resulting in sufficiently high voltage to the ECU/instrument cluster). Because the circuit uses a small current, the output signal from the fluid level sensor will remain high. When the fluid level drops to the threshold level, the output signal will go low. When the output signal is low, and because, in this embodiment, the sensor is fundamentally a FET, where output is pulled to ground, a much larger voltage is drawn. The result is a collapse of supply voltage. As the supply voltage drops, voltage regulation breaks down, the three-wire fluid level sensor circuit becomes inactive, and the output of the three-wire fluid level sensor circuit is released. This, in turn, results in a rise of the output of the power supply line.

The oscillation cycle is repeated, and when voltage rises, the voltage regulation operates again, the fluid level sensor circuit initiates, powers up, and again detects a low fluid level, thereby changing output signal state, and again activating the supply modulation driver. This oscillation cycle continues, resulting in a series of spikes as the voltage output of the supply modulation driver (see plot 122 in FIGS. 1 and 2). This aspect is possible because of the properties of the three-wire fluid level sensor circuit (i.e., requiring low current and operating quickly). In this oscillation cycle, the result is very brief high periods and longer low periods. If averaged, an end result (i.e., after filtering) is a transition from high to low. Thus, if this embodiment of the circuit is employed and connected to an ECU/instrument cluster (e.g., as shown in FIG. 2), the fluid level sensing circuit detects fluid below a trigger threshold and then provides a low output signal (see plot 120 in FIG. 1). This low output signal level of the fluid level sensor triggers (activates) the supply modulation driver, resulting in a voltage output of the supply modulation driver fluctuating between 12 V and 0 V (see plot 122 in FIGS. 1 and 2).

Typically, a conventional two-wire float switch, normally associated with vehicle use, is a normally open switch that hangs between the two-wire input terminals of the ECU. When the switch is open, the signal input to the ECU is 12 V, and is divided down to 5 V at the input to the controller/indicator circuit. When the typical float switch is activated, voltage goes to ground due to voltage drop across the pull up resistor. Therefore, input voltage to the controller/indicator circuit is also at ground.

In an embodiment of the disclosure, the three-wire fluid level sensor circuit is a three-wire/terminal device compatible with a two-wire interface ECU system, with the addition of a supply modulation driver and a voltage regulator, configured to allow connection of the three-wire fluid level sensor assembly to a conventional ECU circuit (typically designed for interface with a two-wire float switch). Therefore, one benefit is the ability to use this three-wire fluid level sensor on a two-wire ECU interface, by the addition of the three-wire fluid level sensor circuit and the supply modulation method described herein. As mentioned below, another benefit is the avoidance of the use of magnets, often employed in two-wire float switches. As detailed above, an embodiment of the disclosure uses the output signal (via the third wire) of the three-wire fluid level sensor to drive the modulator so that the resulting three-wire fluid level sensor assembly functions similarly to a two-wire sensor switch, as input to the ECU.

In a typical two-wire mechanical float system, when the fluid is high in the vessel (i.e., when the switch is open), voltage at the input to the ECU (prior to the resistors $R_d$, $R_d$) is 12 V, and the voltage is 5 V (subsequent the resistors $R_d$, $R_d$) at the controller/indicator circuit. When the float switch is closed (i.e., when fluid is low in the vessel), voltage at the input to the ECU moves to 0 V, therefore the voltage subsequent the resistors $R_d$, $R_d$ moves to 0 V, and the controller/indicator circuit will act.

Because an electronic circuit needs power, ground and a signal line, an electronic circuit cannot be simply transplanted directly into a two-wire system (such as that designed for a two-wire input ECU), because there is no connection point for the signal line in a two-wire input ECU. By modulating the voltage supply of a ECU via the supply modulation driver, the fluid level sensor assembly is able to provide a supply that both serves the three-wire fluid level sensor circuit and drives the signal back into the ECU. This is possible because of a circuit embodiment that is low current and, therefore, does not load the pull-up resistor in an inactive state. In the inactive state, when the output signal level is high, the voltage regulator is used to provide 5 V from a 12 V supply, where 5 V is used to energize the three-wire fluid level sensor circuit, which measures fluid level in a vessel (i.e., the presence or level of fluid therein).

In an embodiment, when fluid drops below a pre-determined level in the vessel, the output signal will drop low, causing the three-wire fluid level sensor to come on. Current will be drawn down to ground, causing supply voltage to drop very quickly. When the supply voltage drops, the three-wire fluid level sensing circuit is starved of supply voltage and, therefore, the three-wire fluid level sensing circuit will stop functioning. This will release the supply modulation driver, and the voltage supply will rise again (see plot at 122 in FIGS. 1 and 2). Power is then restored back to the three-wire fluid level sensor circuit, which again does a measurement of the fluid level within the vessel. If fluid level is still low, the output signal level will be low again, causing the supply modulation driver circuit to pull the output voltage down, thus becoming the second modulation cycle, which again starves the three-wire fluid level sensor circuit, thus releasing the supply modulation driver. This voltage oscillation cycle continues and effectively modulates the voltage, which, after being filtered (e.g., the voltage divider including the two resistors $R_d$, $R_d$) within the ECU, results in the controller/indicator circuit being in an active state (e.g., 1.25 V). When the voltage is not oscillating, the controller/indicator circuit is in an inactive state, where the controller/indicator circuit sees a voltage above a logic threshold (e.g., 3.75 V, see plot 126 in FIG. 2).

In any of the embodiments above, the three-wire fluid level sensor and/or corresponding method by which the three-wire fluid sensor is sensing fluid (e.g., by employing field effect sensors) may be the same as or similar to those described in U.S. Pat. No. 9,441,624. A significant advantage of using this type of fluid sensor and/or corresponding method is that no magnets are required. As such, the disadvantages and deleterious effects of employing magnets in two-wire fluid level sensors are avoided.

Although embodiments are described above with reference to a three-wire fluid level sensor and corresponding method of sensing fluid of the type disclosed in U.S. Pat. No. 9,441,624, the fluid level sensor and/or method of sensing fluid described in any of the above embodiments may alternatively be a different type of fluid level sensor or method of sensing fluid. Such alternatives are considered to be within the spirit and scope of the present invention, and may therefore utilize the advantages of the configurations and embodiments described above.

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A fluid level sensor assembly comprising:
   a fluid level sensor comprising first, second, and third wires, wherein the third wire carries an output signal configured to fluctuate between a low output signal level and a high output signal level; and
   a supply modulation driver electrically connected to the third wire;
   wherein the fluid level sensor, via the first, second, and third wires, is configured to serve as an input to a two-wire input electronic control unit (ECU).

2. The fluid level sensor assembly of claim 1, wherein the first wire provides a supply voltage to the fluid level sensor.

3. The fluid level sensor assembly of claim 2, wherein the first wire is configured to be electrically connected to a source voltage via a pull up resistor within the ECU.

4. The fluid level sensor assembly of claim 2, wherein the supply modulation driver is configured to modulate the supply voltage when the supply modulation driver is active.

5. The fluid level sensor assembly of claim 4, wherein the supply modulation driver is active when the supply modulation driver receives and is triggered by the output signal via the third wire.

6. The fluid level sensor assembly of claim 4, wherein the supply modulation driver is active when the supply modulation driver receives and is triggered by the low output signal level of the output signal via the third wire.

7. The fluid level sensor assembly of claim 6, wherein the modulated supply voltage results in a drop in the supply voltage at the first wire that triggers a disruption of power to the fluid level sensor.

8. The fluid level sensor assembly of claim 7, wherein the disruption of power deactivates the fluid level sensor which releases the supply modulation driver, resulting in a re-application of power to the fluid level sensor via a rise in the supply voltage at the first wire.

9. The fluid level sensor assembly of claim 8, wherein the disruption and re-application of power to the fluid level sensor, via the respective drop and rise in the supply voltage at the first wire, is repeated, to create voltage oscillation configured to activate an indicator circuit of the ECU.

10. The fluid level sensor assembly of claim 9, wherein the low output signal level and the high output signal level correspond, respectively, to active and inactive states of the fluid level sensor.

11. The fluid level sensor assembly of claim 2 further comprising a voltage regulator electrically connected to the first wire, such that the supply voltage to the fluid level sensor is regulated.

12. The fluid level sensor assembly of claim 4 further comprising a voltage regulator electrically connected to the first wire, wherein the voltage regulator regulates the modulated supply voltage to the fluid level sensor via the first wire.

13. The fluid level sensor assembly of claim 1, wherein the supply modulation driver is inactive when the output signal is at the high output signal level.

14. The fluid level sensor assembly of claim 1, wherein the second wire is configured to be electrically connected to ground, and the supply modulation driver is further electrically connected to ground.

15. The fluid level sensor assembly of claim 1, wherein a fluctuation from the low to the high output signal level, or from the high to the low output signal level, is an output signal change of state, and wherein the supply modulation driver is activated, from a de-activated condition, upon receipt of the output signal change of state from the third wire.

16. The fluid level sensor assembly of claim 15, wherein activation of the supply modulation driver creates a voltage oscillation configured to activate an indicator circuit of the ECU.

17. A method of operating a two-wire circuit function by supply modulation, the method comprising:
   triggering a fluid level sensor comprising first, second, and third wires, where the third wire carries an output signal configured to fluctuate between a low output signal level and a high output signal level, where a fluctuation from the low to the high output signal level, or from the high to the low output signal level, is an output signal change of state;
   activating a supply modulation driver upon receipt of the output signal change of state from the third wire; and
   creating a voltage oscillation, by the activated supply modulation driver, configured to serve as an input to a two-wire input electronic control unit (ECU).

18. The method of claim 17, wherein the voltage oscillation, created by the activated supply modulation driver, is configured to activate an indicator circuit of the ECU.

19. The method of claim 17, wherein the first wire and the second wire of the fluid level sensor are configured to connect to the input of the two-wire input ECU.

20. The method of claim 17 further comprising regulating a supply voltage to the fluid level sensor by a voltage regulator electrically connected to a first wire of the fluid level sensor and configured for electrical connection with an input of the two-wire input ECU.

\* \* \* \* \*